United States Patent
Stojkovic et al.

(10) Patent No.: US 9,809,256 B1
(45) Date of Patent: Nov. 7, 2017

(54) VEHICLE BODY STRUCTURE

(71) Applicant: Ford Global Technologies, LLC, Dearborn, MI (US)

(72) Inventors: Dragan B. Stojkovic, Taylor, MI (US); Colleen Marie Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/175,334

(22) Filed: Jun. 7, 2016

(51) Int. Cl.
*B60N 2/02* (2006.01)
*B62D 25/12* (2006.01)
*B60R 19/52* (2006.01)

(52) U.S. Cl.
CPC .............. *B62D 25/12* (2013.01); *B60R 19/52* (2013.01)

(58) Field of Classification Search
CPC .................................. B62D 25/12; B60R 19/52
See application file for complete search history.

(56) References Cited

U.S. PATENT DOCUMENTS

| | | | |
|---|---|---|---|
| 4,403,648 A | 9/1983 | Styok | |
| 6,282,790 B1 | 9/2001 | Jaekel et al. | |
| 6,293,615 B1 | 9/2001 | Tarahomi | |
| 6,416,119 B1 | 7/2002 | Gericke et al. | |
| 6,755,461 B2 | 6/2004 | Seksaria et al. | |
| 7,210,733 B2 | 5/2007 | Mouch et al. | |
| 7,766,420 B2 | 8/2010 | Maruyama et al. | |
| 8,550,545 B1 * | 10/2013 | Stojkovic | B62D 21/12 296/193.09 |
| 9,079,617 B1 * | 7/2015 | Lueschen | B62D 27/023 |
| 2002/0057004 A1 * | 5/2002 | Corcoran | B62D 21/02 296/203.01 |
| 2003/0085591 A1 * | 5/2003 | Seksaria | B60K 5/12 296/193.04 |

* cited by examiner

*Primary Examiner* — Lori L Lyjak
(74) *Attorney, Agent, or Firm* — Jason Rogers; Brooks Kushman, P.C.

(57) ABSTRACT

A vehicle includes a frame and a body supported above the frame. The body includes a pair of hinge pillars disposed on opposite sides of the body and a bulkhead extending between the hinge pillars. A pair of one-piece hydroformed front-support tubes is each attached to one of the hinge pillars at a back end of the tube. Each of the tubes includes a forwardly extending portion, and a transversely extending portion attached to the frame and terminating at a front end. The front ends are attached to each other by an overlapping joint located behind a front fascia of the vehicle.

19 Claims, 4 Drawing Sheets

VEHICLE BODY STRUCTURE

TECHNICAL FIELD

The present disclosure relates to a vehicle front-end structure having a pair of fender-support tubes joined to each other at a joint.

BACKGROUND

Vehicle front-end structures provide mounting features for various vehicle components including body panels, hoods, and engine components. The front-end structure may further be utilized to manage loads from vehicle impact and other sources. Methods of joining the front-end structure using advanced lightweight materials may have an impact on vehicle performance.

SUMMARY

According to an aspect of the present disclosure, a vehicle front end includes two hinge pillars each disposed on opposite sides of the vehicle, and a pair of one-piece hydroformed tubes. Each tube includes a forwardly extending portion attached to one of the pillars and a transversely extending portion terminating at a distal end. The distal ends are attached to each other by only a single joint located in a central region of the front end.

According to another aspect of the present disclosure, a front-end structure of a vehicle includes a pair of structural members each disposed on opposite sides of the vehicle, and a pair of one-piece hydroformed fender-support tubes each attached to one of the members at a proximal end and extending forward therefrom. Each of the tubes has a longitudinally extending portion that includes the proximal end, and a transversely extending portion that curves inwardly toward a longitudinal centerline of the vehicle and terminates at a distal end. The tubes are only attached to each other at the distal ends by a single joint.

According to yet another aspect of the present disclosure, a vehicle includes a frame and a body supported above the frame. The body includes a pair of hinge pillars disposed on opposite sides of the body and a bulkhead extending between the hinge pillars. A pair of one-piece hydroformed front-support tubes is each attached to one of the hinge pillars at a back end of the tube. Each of the tubes includes a forwardly extending portion, and a transversely extending portion attached to the frame and terminating at a front end. The front ends are attached to each other by an overlapping joint located behind a front fascia of the vehicle. A bolster is connected to each of the transversely extending portions and defines a portion of the front fascia. The bulkhead, the pair of tubes and the bolster cooperate to define an engine compartment.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

A common multiple axis system is used in each of the figures to indicate relative directions with respect to the vehicle. An X-axis denotes a longitudinal direction, a Y-axis denotes a lateral direction, and a Z-axis denotes a vertical direction.

Figure 1:
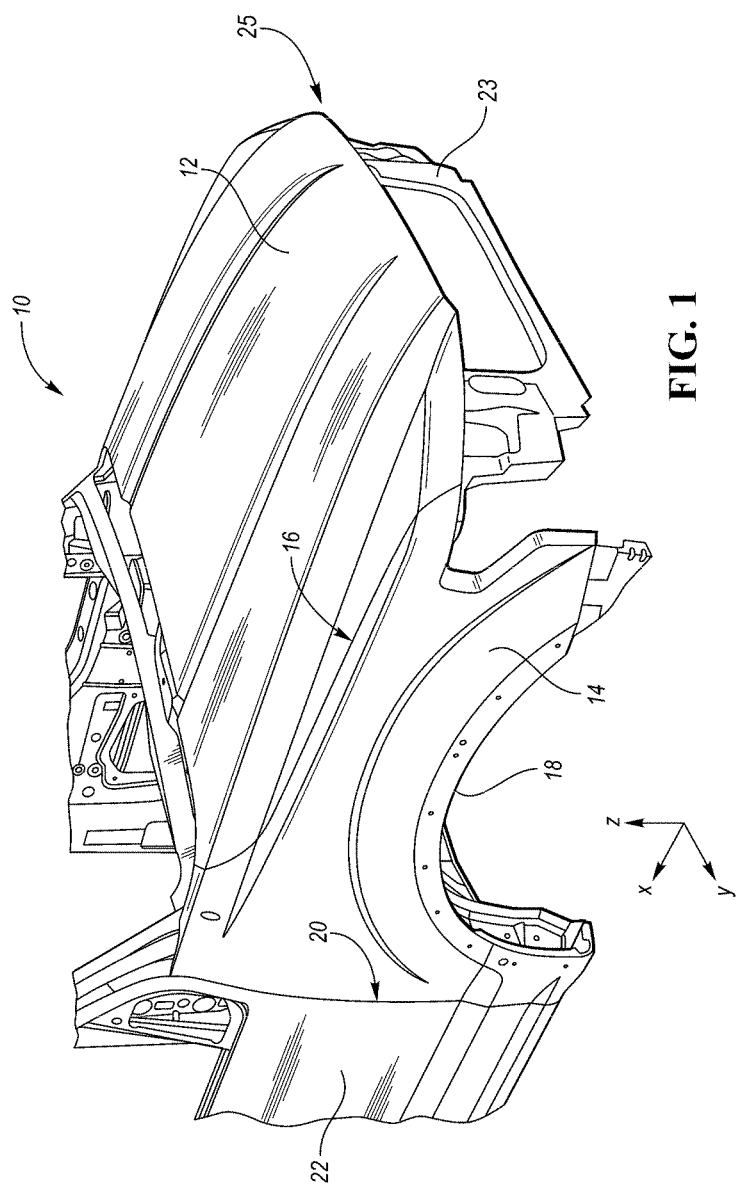
FIG. 1 is a perspective view of a portion of a front end of a vehicle.

Referring to FIG. 1, a front end of a vehicle 10 is depicted that supports several outer panels. A hood 12 is hinged and covers an engine compartment in a closed position. Access to the engine compartment is provided when the hood 12 is rotated to an open position. Each of a pair of fenders 14 is adjacent to the hood 12 on either side. The fenders 14 are fixed and create a margin gap 16 to the hood 12. The fenders 14 also create an interface to a front wheel well 18 at a lower portion. At a rear portion, the fenders 14 create a margin gap 20 to a side door 22. The fenders 14 and the hood 12 require sufficient underlying front-end structure in order to maintain proper fit relative to each other, as well as operability. A bolster 23 is disposed at the front of the vehicle 10 and forms the main structural support of the front fascia 25. The bolster 23 may support the radiator, the hood, the headlights, the fan, the grille, and other components.

Figure 2:
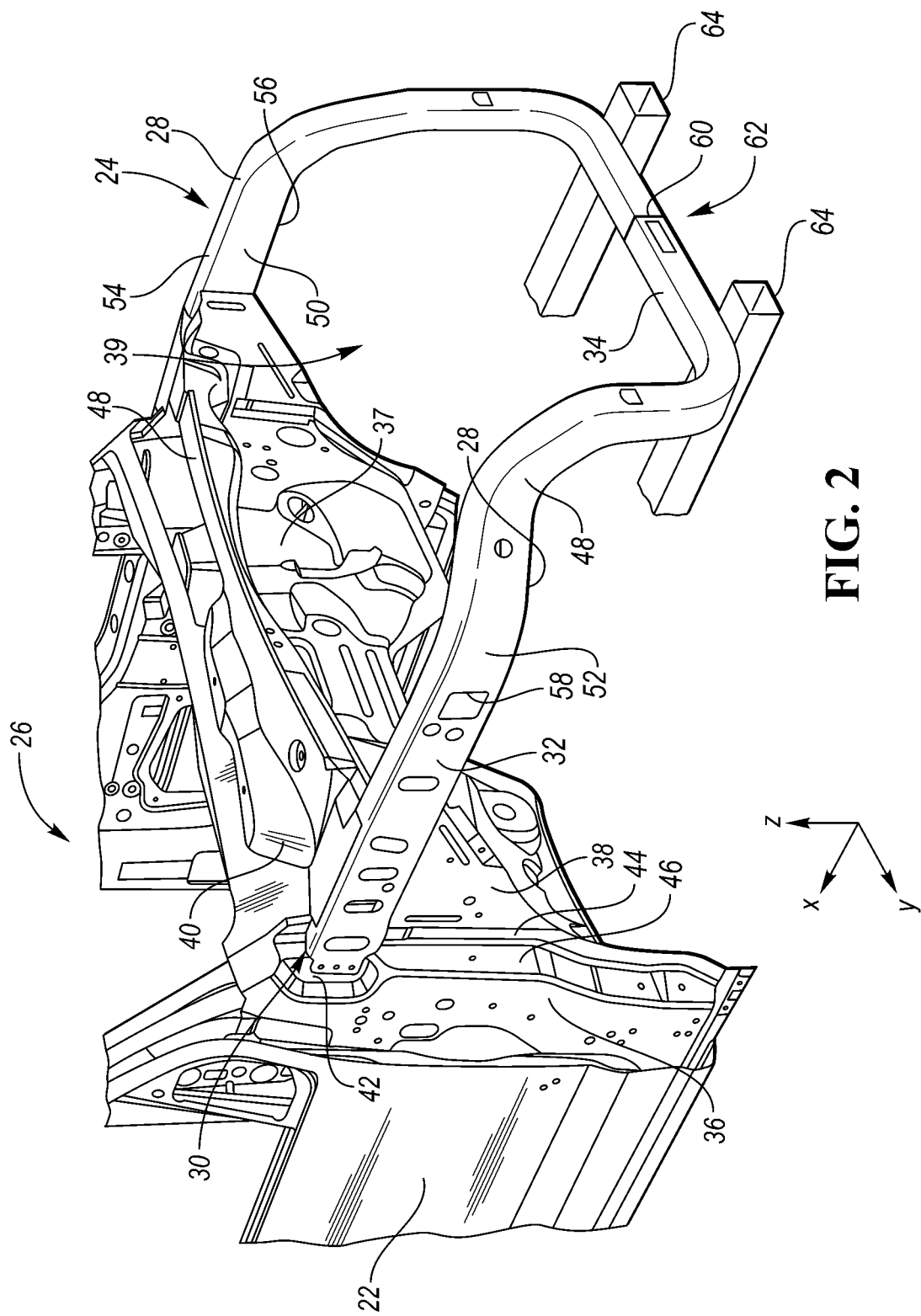
FIG. 2 is a perspective view of the vehicle shown in FIG. 1 with many of the body panels removed to show the fender-support tubes.

Referring to FIG. 2, a front-end structure 24 of the vehicle 10 is shown with the body panels removed. The front-end structure 24 extends forward from a passenger cabin 26. The cabin 26 includes hinge pillars 36 and cowl-side panels 38 on each side of the vehicle. A bulkhead 37 extends between the hinge pillars 36 and defines a rear-most portion of the engine compartment 39. For each side of the vehicle, the cowl-side panel 38 defines a first vertical and longitudinal plane that is in the X-Z plane. The hinge pillar 36 may be connected to the rear portion of the cowl-side panel 38 at a flange 44. The flange 44 is also in the X-Z plane. The hinge pillar 36 and the cowl-side panel 38 may be attached by rivets, bolts, screws, adhesive or welding. In one embodiment, the hinge pillar 36 and cowl-side panel 38 are aluminum alloy and are fastened together with rivets. The hinge pillar 36 may include a stepped surface 42 defining a second vertical and longitudinal plane that is in the X-Z plane. The second plane is offset rearward and outward relative to the first plane. The stepped surface 42 is offset laterally outward from the flange 44 in the Y direction. A laterally extending step 46 interconnects the stepped surface 42 and the flange 44 providing a continuous surface transition.

The front-end structure 24 provides mounting support for the hood 12, fenders 14, the bolster 23, and other front-end components. The front-end structure 24 includes a pair of front-fender support tubes 28 (also known as shotgun tubes) that extend longitudinally forward from the passenger cabin 26. The tubes 28 may be formed as a hollow structure. The pair of tubes 28 may be a mirror image of each other except at the distal end. In one embodiment, each of the tubes 28 is hydroformed as a single piece. The tubes 28 may be made of aluminum alloy (such as 6011-T4), steel, magnesium alloy, titanium alloy, polymers, composite materials, and the like. The wall thickness of the tube may be about 2 mm to 5 mm.

Each tube 28 includes a forwardly extending portion 32 having a proximal end 30 that may interface with the hinge pillar 36. The forwardly extending portion 32 generally extends in the X-direction. The forwardly extending portion 32 may also interface with the cowl side 38. For example, the forwardly extending portion 32 may include an inner sidewall 50 and an outer sidewall 52 that is opposite the inner sidewall. The tube 28 also includes an upper sidewall 54 and a lower sidewall 56 along portions of the tube 28. The sidewalls cooperate to define a tubular structure that defines an interior cavity. At the proximal end 30, the tube 28 may only include the opposing inner and outer sidewalls 50, 52. The inner and outer sidewalls extend away from the tubular portion of the tube 28 to match the shape of the hinge pillar 36. The width of the laterally extending step 46 corresponds to the width of the tube 28. The hinge pillar 36 and cowl-side panel 38 cooperate with the tube 28 and allow the tube to nest with the hinge pillar 36 and the cowl-side panel 38. The outer sidewall 52 may be attached to the hinge pillar 36 and the inner sidewall 50 may be attached to the cowl side 38. Each tube 28 also includes a plurality of access holes 58 cut into the outer sidewall 52. The access holes allow fasteners and tools to access the inner sidewall 50 for attachment of the inner sidewall to the cowl-side panel 38 and hinge pillar 36.

A cowl top 40 is disposed on top of the tubes 28 and the HVAC plenum 49. The cowl top 40 is attached to the upper sidewall 54 of each tube 28 and spans between the pair of tubes 28 to provide additional lateral support to the front-end structure 24. Hood mounts (not shown) are disposed on the cowl top 40 and are fastened to the upper sidewall 54. The top fasteners may be rivets, bolts or screws. The top fasteners are installed on the vehicle from the outside of the vehicle and are fully serviceable from the outside of the vehicle.

The forwardly extending portion 32 is substantially straight (in the X-direction) over all or most of its length. The straight portion may have a uniform cross-sectional shape reducing tooling needed to impart more complex formations and bends on the tube 28. The straight portion of the tube 28 also allows for more direct load transfer and increased part stiffness.

Each tube 28 also includes a transversely extending portion 34 that is connected to the forwardly extending portion 32 by an intermediate portion 48. In one embodiment, the portions 32, 34, and 48, are integrally formed as a single hydroformed piece. The transversely extending portion 34 may be at a lower height (in the Y-direction) than the forwardly extending portion 32. The transversely extending portion 34 generally extends in the Y-direction. The distal ends 60 of each of the tubes 28 are connected to each other at a joint 62 that is located in a central region of the front end. The central region is defined between the frame rails. In one embodiment, the joint 62 is laterally located on or near (within 30 cm) the longitudinal centerline of the vehicle 10. Each of the transversely extending portions 34 are connected to a corresponding one of the frame rails 64. The intermediate portions 48 and the transversely extending portions 34 cooperate to define a framing for the bolster 23, which is a substructure of the front fascia.

In many prior art solutions, the shotgun tubes are not directly connected to each other at a single joint as proposed in the illustrated example of FIG. 2. Instead, a cross member may connect the shotgun tubes. This requires at least two joints and at least one additional component, which can increase cost and assembly time. Hydroforming allows the shotgun tubes to have more complex geometries—such as the forwardly extending portions and the transversely extending portion disclosed above—without high economical costs. As such, the tubes may be formed to curve toward each other to allow direct connection via a single joint as shown in FIG. 2.

Figure 3:
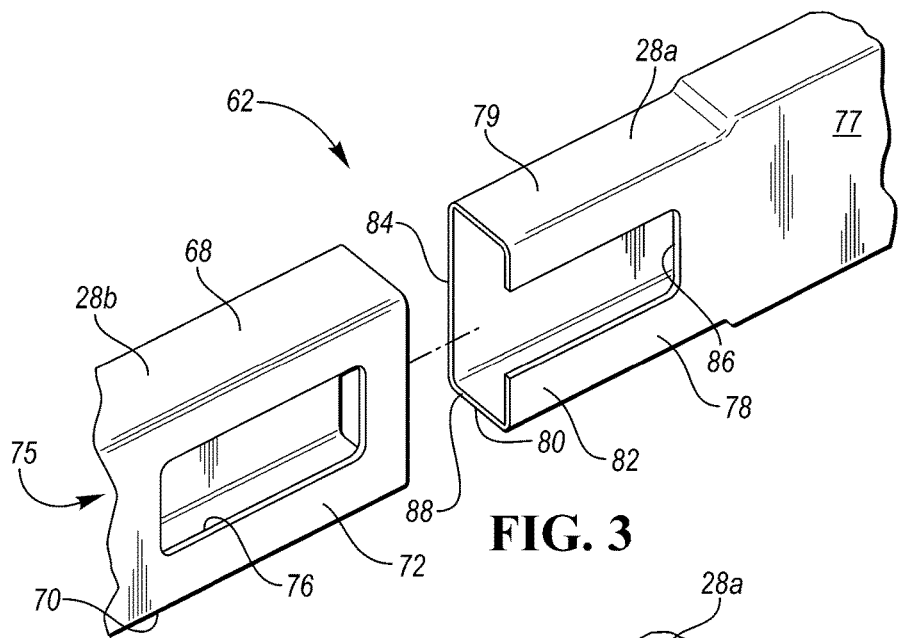
FIG. 3 is an exploded perspective view of an example joint.
Figure 4:
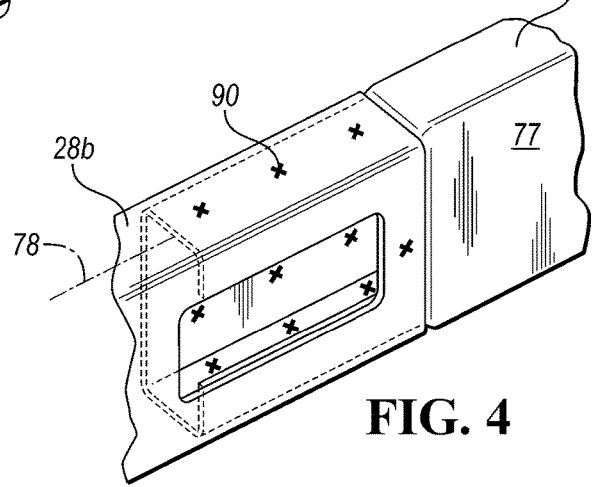
FIG. 4 is a perspective view of the joint of FIG. 3 assembled together.

Referring to FIGS. 3 and 4, the joint 62 may be a glove joint in which a portion of the driver-side tube 28a is telescopically disposed within a portion of the passenger-side tube 28b. The passenger-side tube 28b may include top side 68, a bottom side 70, front side 72, and a back side that cooperate to define a rectangular box structure having an interior 75. The driver-side tube 28a includes a main portion 77, and an insertion portion 78 having a diameter that is smaller than the main portion 77. The insertion portion 78 is sized and shaped to be telescopically received within the interior 75. The insertion portion 78 includes a top surface 79, a bottom surface 80, a front surface 82, and a back surface 84 that are each disposed against an inside surface of a corresponding side of the passenger-side tube 28b when the joint is assembled. Each of the tubes may define a cutout 76, 86 that allows access to the interiors of the tubes for attachment of the tubes. In the illustrated example, cutout 76 is defined in the front 72 of the passenger-side tube, and cutout 86 is defined in the front surface 82 of the driver-side tube. The cutout 86 may be a slot that extends from a terminus 88 of the tube 28a. In other embodiments, the cutouts may be on another side of the tube such as the top, bottom or back. When the tubes are fully seated, the cutouts are aligned allowing access into the interiors of the tubes. The glove joint 62 may be secured by spot welds 90, or by other attachment means known, such as fasteners.

Figure 5:
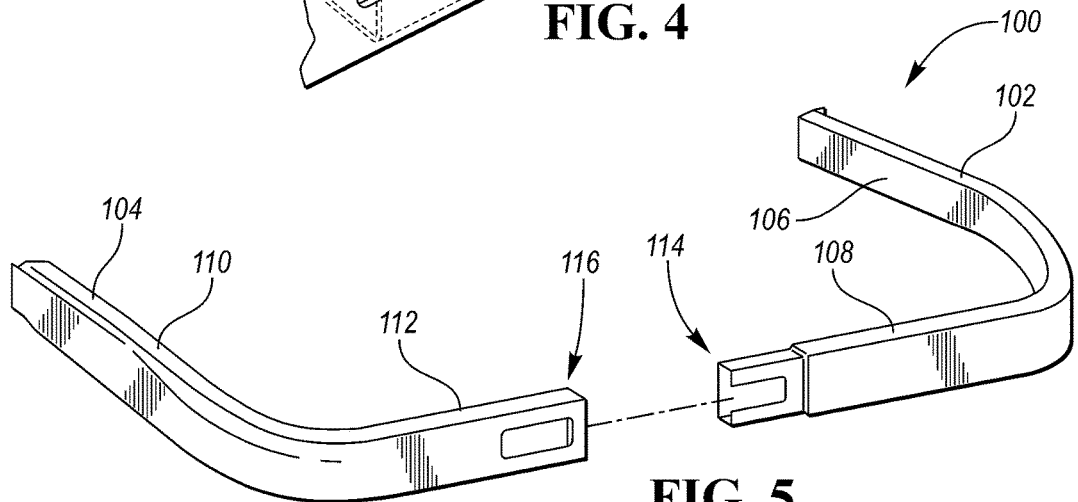
FIG. 5 is an exploded perspective view of belt-line front-end structure.
Figure 6:
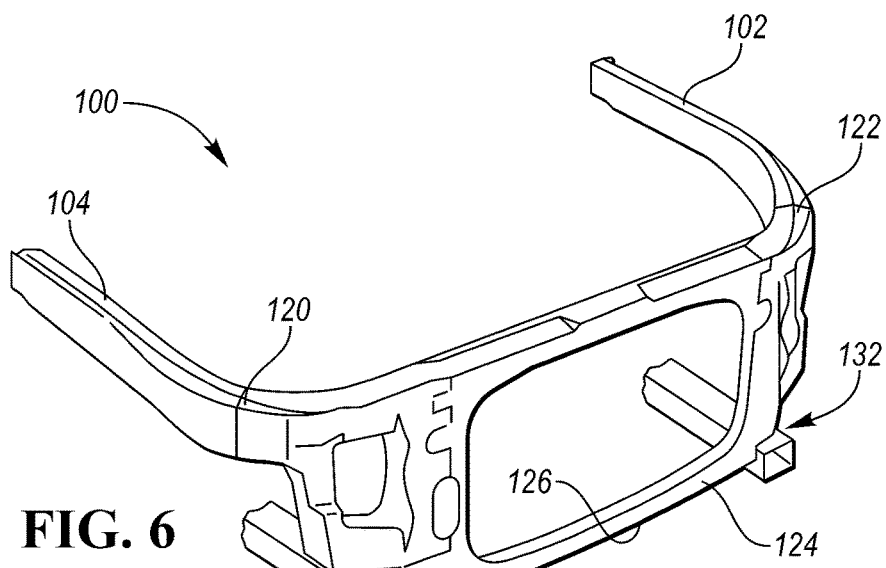
FIG. 6 is a perspective view of the front-end structure of FIG. 5 having a bolster attached thereto.

Referring to FIGS. 5 and 6, a belt-line front-end structure 100 includes a driver-side fender-support tube 102 having a forwardly extending portion 106 and a transversely extending portion 108 that terminates at a distal end 114. The structure 100 also includes a passenger-side fender-support tube 104 having a forwardly extending portion 110 and a transversely extending portion 112 that terminates at a distal end 116. Unlike tubes 28, the forwardly extending portion 106 and the transversely extending portion 108 of the belt-line structure 100 lie at the substantially same height. The tubes 102, 104 may be connected to each other via a glove joint in which the distal end 114 is received within the distal end 116. Similar to the front-end structure 24, the front-end structure 100 may be connected to the hinge pillars 36 and the cowls sides 38 as shown in FIG. 2 and described in the associated text.

The front-end structure 100 also includes a bolster 124 that is connected to the tubes 102, 104 at least at joint 120 and joint 122 that are located on an upper side of the bolster. A lower side 126 of the bolster 124 is connected to each of the frame rails 128 at joint 130 and joint 132.

Figure 7:
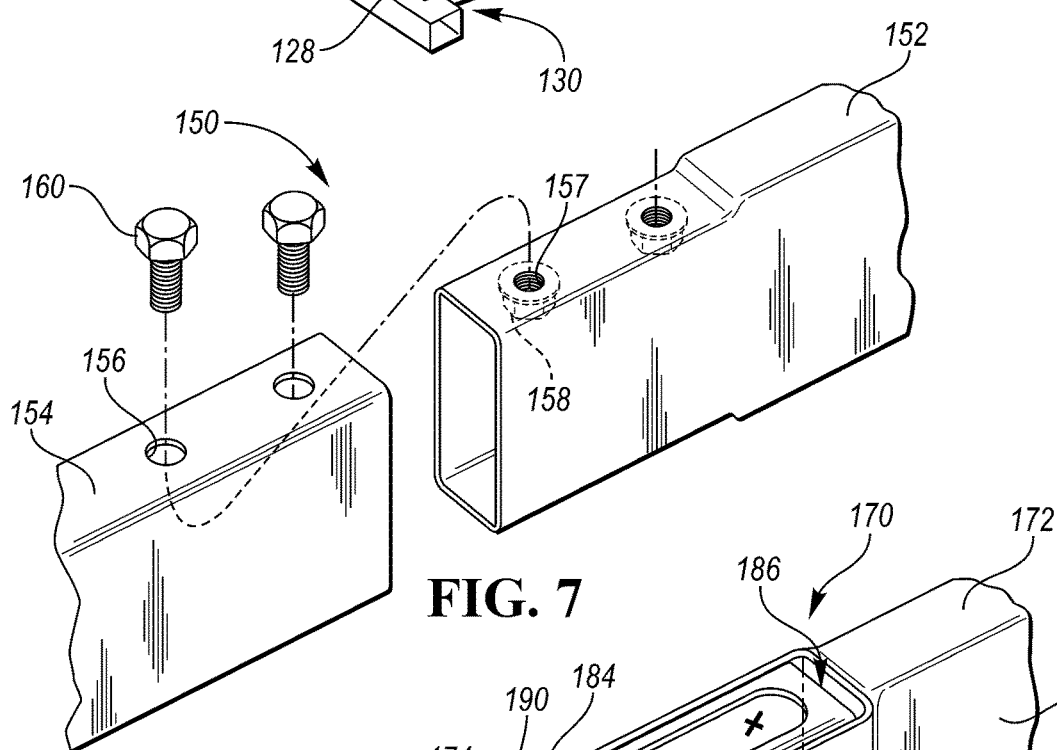
FIG. 7 is a perspective view of another joint.

FIG. 7 illustrates a glove joint 150 according an alternative embodiment. The joint 150 is a glove joint in which the driver-side tube 152 is telescopically received within the passenger-side tube 154. The tubes 152, 154 may be secured together via fasteners 160 that extend through the tops of the tubes. Of course, the fasteners could be disposed on another surface of the tubes. The tube 154 may define holes 156 that align with holes 157 defined in the tube 152 when the tubes are inserted into each other. A weld nut 158 is secured to an inside surface of the tube 152 such that it is aligned with the holes 157. The fasteners 160 extend through the holes 156, 157 and threadably engage the weld nuts 158. While FIG. 7 illustrates bolts securing the joint 150, other types of joining are contemplated by this disclosure: including screws, rivets, clinch joints, adhesives, and welding.

Figure 8:
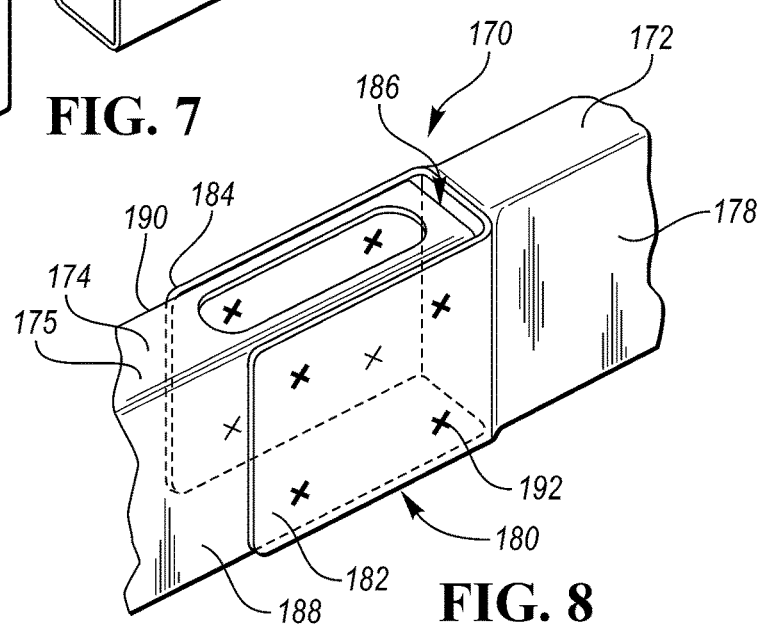
FIG. 8 is a perspective view of yet another joint.

FIG. 8 illustrates a closed-box joint 170 according to yet another embodiment. The joint 170 joints the driver-side tube 172 to the passenger-side tube 174. The tube 174 may be a closed-box structure having a top 175, a bottom, a front 188, and a back 190. The top 175 may define an access hole 176. The tube 172 may include a main portion 178 having a closed-box structure and an attachment portion 180 that only includes a front wall 182 and a back wall 184. The walls 182 and 184 are spaced apart to define a receiving area 186. The joint 170 is assembled by inserting the distal end of the tube 174 into the receiving area 186 such that the wall 182 is disposed against the front 188 and the wall 184 is disposed against the back 190. The tubes may be secured by welds 192 on the walls 182 and 184. Of course, the joint 170 may use fasteners, clinch joints, rivets, or other securing means instead of welding.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle front end comprising:
two hinge pillars each disposed on opposite sides of the vehicle; and
a pair of one-piece hydroformed tubes each including a forwardly extending portion attached to one of the pillars, and a transversely extending portion terminating at a distal end, wherein the distal ends are attached to each other by only a single joint located in a central region of the front end.

2. The front end of claim 1, wherein the joint is laterally located within 20 centimeters of a longitudinal centerline of the vehicle.

3. The front end of claim 1, wherein the distal ends are sized such that one of the distal ends is telescopically disposed within the other of the distal ends at the joint.

4. The front end of claim 3, wherein the each of the distal ends defines a cutout arranged such that interiors of the tubes are accessible via the cutouts when the joint is formed.

5. The front end of claim 1, wherein the transversely extending portion is located at a lower height than the forwardly extending portion.

6. The front end of claim 1, wherein each of the tubes, at the distal ends, is a closed-box section having four sides.

7. The front end of claim 1, wherein each of the transversely extending portions are attached to a frame of the vehicle.

8. The front end of claim 1, wherein the distal ends are welded to each other at the joint.

9. The front end of claim 1, wherein the transversely extending portions are attached to a bolster of the vehicle.

10. A front-end structure of a vehicle comprising:
a pair of structural members each disposed on opposite sides of the vehicle; and
a pair of one-piece hydroformed fender-support tubes each attached to one of the members at a proximal end and extending forward therefrom, each of the tubes having a longitudinally extending portion that includes the proximal end, and a transversely extending portion that curves inwardly toward a longitudinal centerline of the vehicle and terminates at a distal end, wherein the tubes are only attached to each other at the distal ends by a single joint.

11. The front-end structure of claim 10 further comprising a bolster connected to each of the transversely extending portions to define a portion of a front fascia of the vehicle, and wherein the joint is disposed behind the bolster.

12. The front-end structure of claim 10, wherein the distal ends are sized such that one of the distal ends is telescopically disposed within the other of the distal ends at the joint.

13. The front-end structure of claim 12, wherein the each of the distal ends defines a cutout that is arranged such that interiors of the tubes are accessible via the cutouts when the joint is formed.

14. The front-end structure of claim 10, wherein, for each of the tubes, the distal end is located at a height that is lower than the proximal end.

15. A vehicle comprising:
a frame;
a body supported above the frame and including a pair of hinge pillars disposed on opposite sides of the body and a bulkhead extending between the hinge pillars;
a pair of one-piece hydroformed front-support tubes each attached to one of the pillars at a back end of the tube, each of the tubes including a forwardly extending portion, and a transversely extending portion attached to the frame and terminating at a front end, wherein the front ends are attached to each other by an overlapping joint located behind a front fascia of the vehicle; and
a bolster connected to each of the transversely extending portions and defining a portion of the front fascia, wherein the bulkhead, the pair of tubes and the bolster cooperate to define an engine compartment.

16. The vehicle of claim 15 further comprising a pair of cowl sides each attached to a forward portion of the hinge pillar, wherein each of the tubes are attached to a corresponding one of the cowl sides.

17. The vehicle of claim 15, wherein the joint is located within 20 centimeters of a longitudinal centerline of the vehicle.

18. The vehicle of claim 15, wherein the tubes are only connected to each other at the joint.

19. The vehicle of claim 15, wherein the joint is disposed below a grille opening of the front fascia.

* * * * *